Patented June 25, 1940

2,205,896

UNITED STATES PATENT OFFICE 2,205,896

METHOD OF REFINING CLAYEY IRON ORES

Hidesuke Yamagata, Tokyo, Japan

No Drawing. Application June 15, 1939,
Serial No. 279,273

3 Claims. (Cl. 75—41)

The present invention relates to a method of smelting clayey iron ore, characterised by adding phosphate-containing substances such as phosphate rock (or iron phosphate ore) or phosphorus-containing steel slag to chromium-containing clay iron ore, charging the same in a blast furnace together with coke and a flux, carrying out the operation in such a way that the ratio of the lime, magnesia, iron oxide and manganese oxide to the silica and alumina, as

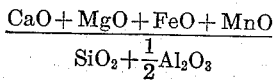

contained in the slag is within the limit of 0.85–0.5, thus lowering the chromium content of pig iron, while raising the phosphorus content to not less than 1.5%, and then transferring the said pig iron to a basic converter while it is in a molten state and removing the remaining chromium and phosphorus by treating it according to the known process. The object thereof is to produce steel of superior quality simply and economically on a large industrial scale from the chromium-containing clayey iron ore difficult to smelt by the known methods.

Generally, it is the peculiar property of the clayey iron ore to contain silica, aluminium and chromium besides iron. It usually contains 1–6% each of chromium oxide and silica and 4–17% of aluminium oxide, and sometimes nickel as well, but hardly phosphorus. Accordingly, if it is smelted in the blast furnace by the ordinary process, the chromium contained in the ore is hardly separated as a slag, but the major part of it stays in the pig iron with the result that if an acidic converter, viz., Bessemer converter or acidic open hearth is used in treating such pig iron for decarburization and steelification, the chromium cannot be removed, and also that if the basic open hearth furnace is used, the steel slag has its viscosity increased considerably when the chromium content is large, inevitably causing various troubles to the operation. This fact makes it unfit for use in a large quantity separately as the raw material for iron manufacture. That is to say, there is no other way than to employ only a small part of it mixed with other iron ore not containing or containing only a slight quantity of chromium, so that it is practically impossible to use such clayey iron ore in a large amount in iron manufacture. Just by way of experiment, mix clayey iron ore containing 50.23% of iron, 1.76% of silica, 10.48% of aluminium oxide, 3.03% of chromium oxide and 0.022% of phosphorus with other ordinary iron ore in different proportions and smelt the mixture, and the chromium will remain in the pig iron in the following quantities:

| Proportion of clayey iron ore for the entire iron ore | Chromium content of pig iron | Remaining chromium |
|---|---|---|
| Percent | Percent | Percent |
| 25 | 0.81 | 98.8 |
| 50 | 1.70 | 98.8 |
| 75 | 2.69 | 97.8 |
| 100 | 3.78 | 96.0 |

Now, when the chromium contained in the pig iron, which is the raw material for steel, exceeds 0.5%, the operation is difficult with the ordinary open hearth furnace, because the steel slag has high viscosity and flows badly, lowering the productive capacity of the furnace. This is especially the case where chromium exceeds 1%. Therefore, such kind of pig iron has its chromium content lowered by being mixed with other pig iron not containing chromium or scrap steel, or chromium-containing clayey iron ore is mixed with other iron ore not containing chromium to make pig iron containing a small quantity of chromium, thereby enabling the steel manufacturing operation to be carried out in an open hearth furnace. But, by such a method it is hard to utilize a large amount of chromium containing clayey iron ore. Accordingly, in order to utilize this kind of iron ore in a large amount, what is best is to take away chromium directly from pig iron containing a relatively large quantity of it.

According to the present invention, to such clayey iron ore is especially added a substance containing a large quantity of phosphorus such as phosphate rock, iron phosphate ore and phosphorus-containing steel slag, together with coke, lime stone and manganese ore and the smelting operation is carried out in a blast furnace so that the ratio of lime, magnesia, iron oxide and manganese oxide to silica and alumina as

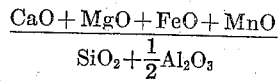

contained in the slag may be within the limit of 0.85–0.5, and about ¼ to ½ of the quantity of the chromium contained in the ore is slagged off, thereby considerably lowering the chromium content of the pig iron, the phosphorus content of the pig iron not being less than 1.5%. Then, it is transferred to a basic converter while it is in a molten state, so as to remove the phosphorus and chromium. In this case, if the slag in the blast furnace is basic, the phosphate has the tendency to be converted into a calcium salt by lime and consequently into a slag, but as in the present invention a slag of strong acidity is formed, the phosphorus is introduced into the pig iron and is burnt in the following operation in a basic converter so that it may be utilized to remove the chromium.

In the open hearth furnace, the contents are only heated by blowing fuel against their surface from the upper part of the furnace, so that if the basic character of the slag is increased to take away a large quantity of chromium during the operation as stated above, the refining is made difficult, whereas in the basic converter, since air at high pressure is supplied to the converter at the bottom, the contents are stirred continuously by this blast and also their chemical change is accelerated by utilizing the combustion heat of the phosphorus, thereby transferring the chromium in the pig iron into the slag. Consequently, even if the viscosity of the steel slag is increased to the necessary degree by the presence of chromium, it does not make the operation difficult. However, after lowering the chromium content to a fairly great extent by using the basic converter, the pig iron may be treated in an open hearth furnace. Further, if the initial material, iron ore happens to be rich in phosphorus and accordingly the pig iron produced contains above 1.5% of phosphorus, the addition of phosphorus ore may be omitted. It is already known that in the manufacture of Thomas pig iron by smelting an ordinary iron ore in a blast furnace the operation is often carried out keeping the ratio of lime to silica in the slag less than unity, and also that the phosphorus containing steel slag is charged in a blast furnace together with iron ore. In the present invention, for the purpose of removing chromium from the ore, in the first place about ¼ to ½ of the chromium in the ore is slagged off in a blast furnace by working in a remarkable acidic operation as stated above. Then the pig iron is refined in a basic converter under a strong basic slag, thus removing practically all of the remaining chromium. As already stated, on account of a peculiar operation of the converter introducing strong blast at the bottom, the viscosity of the strong basic slag gives no trouble in the refining. It therefore is plainly different from the known art in the idea.

The following is an example of carrying out this invention into practice:

Charge the following materials into a blast furnace:

|  | Per cent |
|---|---|
| Sintered iron ore containing 3.15% of $Cr_2O_3$ | 30 |
| Ordinary iron ore | 30 |
| Phosphate rock | 3 |
| Manganese ore | 1 |
| Lime stone | 9 |
| Coke | 27 |

Operate the smelting in such a manner that the ratio of lime, magnesia, iron oxide and manganese oxide to silica and alumina as $$\frac{CaO+MgO+FeO+MnO}{SiO_2+\frac{1}{2}Al_2O_3}$$

contained in the slag is kept about 0.83. The pig iron thus obtained contains too much sulphur and therefore it is desulphurized in the ladle by adding 3% of soda ash, while it is in a molten state.

Then, transfer it to a basic converter, and after the addition of limestone, burn the phosphorus by supplying air blast. Then, the remaining chromium will be removed. In this way, it will be possible to produce steel containing 0.35% of carbon, a trace of silicon, 0.95% of manganese, 0.072% of phosphorus, 0.049% of sulphur and a trace of chromium.

Having now fully described my invention, I claim:

1. Method of smelting clayey iron ore, which consists in charging chromium-containing clayey iron ore into a blast furnace together with coke and a flux in the presence of a phosphate compound; carrying out the operation so that the ratio of lime, magnesia, iron oxide and manganese oxide to silica and alumina as $$\frac{CaO+MgO+FeO+MnO}{SiO_2+\frac{1}{2}Al_2O_3}$$

contained in the slag may be within the limit of 0.85 to 0.5, thus lowering the chromium content of the pig iron and at the same time increasing the phosphorus content to not less than 1.5%; and next treating the said pig iron in a basic converter while it is in a molten state and thereby removing the remaining chromium and phosphorus.

2. Method of smelting clayey iron ore, which consists in adding phosphorus ore to chromium-containing clayey iron ore; charging the same into a blast furnace together with coke, lime stone and manganese ore; carrying out the operation so that the ratio of lime, magnesia, iron oxide and manganese oxide to silica and alumina as $$\frac{CaO+MgO+FeO+MnO}{SiO_2+\frac{1}{2}Al_2O_3}$$

contained in the slag may be within the limit of 0.85 to 0.5, thus lowering the chromium content of the pig iron and at the same time increasing the phosphorus content to not less than 1.5%; and next treating said pig iron in a basic converter while blowing a strong blast of air up from the bottom and thus removing a large part of the chromium content of the iron and then transferring the iron to a common open hearth furnace and removing the remaining chromium and phosphorus.

3. Method of smelting clayey iron ore, which consists in adding phosphorus ore to chromium-containing clayey iron ore; charging the same into a blast furnace together with coke, lime stone and manganese ore; carrying out the operation so that the ratio of lime, magnesia, iron oxide and manganese oxide to silica and alumina as $$\frac{CaO+MgO+FeO+MnO}{SiO_2+\frac{1}{2}Al_2O_3}$$

contained in the slag may be within the limit of 0.85 to 0.5, thus lowering the chromium content of the pig iron and at the same time increasing the phosphorus content to not less than 1.5%; removing the sulphur by mixing the thus-obtained molten pig iron with an alkaline substance, then transferring the said molten pig iron to a basic converter and removing the remaining chromium and phosphorus.

HIDESUKE YAMAGATA.